(12) United States Patent
Wolgé

(10) Patent No.: US 7,058,621 B1
(45) Date of Patent: Jun. 6, 2006

(54) METHOD FOR EXTRACTING INFORMATION FROM A DATABASE

(75) Inventor: Håkan Wolgé, Lund (SE)

(73) Assignee: Qliktech International AB, Lund (SE)

( * ) Notice: Subject to any disclaimer, the term of this patent is extended or adjusted under 35 U.S.C. 154(b) by 0 days.

(21) Appl. No.: 09/936,500

(22) PCT Filed: Mar. 10, 2000

(86) PCT No.: PCT/SE00/00482

§ 371 (c)(1), (2), (4) Date: Jan. 25, 2002

(87) PCT Pub. No.: WO00/55766

PCT Pub. Date: Sep. 21, 2000

(30) Foreign Application Priority Data

Mar. 12, 1999 (SE) .................. 9900894

(51) Int. Cl.
G06F 17/30 (2006.01)
G06F 17/00 (2006.01)

(52) U.S. Cl. .............. 707/2; 707/3; 707/101

(58) Field of Classification Search .......... 707/1, 707/2, 3, 5, 102; 709/201
See application file for complete search history.

(56) References Cited

U.S. PATENT DOCUMENTS 5,423,035 A 6/1995 DePrez
5,517,641 A 5/1996 Barry et al.
5,842,209 A 11/1998 Mocek et al.
5,960,428 A 9/1999 Lindsay et al.
6,356,900 B1 * 3/2002 Egilsson et al. .............. 707/5
6,434,545 B1 * 8/2002 MacLeod et al. ............ 707/3
6,493,699 B1 * 12/2002 Colby et al. .................. 707/2
6,578,028 B1 * 6/2003 Egilsson et al. .............. 707/2
6,775,681 B1 * 8/2004 Ballamkonda et al. ...... 707/102

FOREIGN PATENT DOCUMENTS

WO WO 00/55766 9/2000

* cited by examiner

Primary Examiner—Uyen Le
Assistant Examiner—Susan Y Chen
(74) Attorney, Agent, or Firm—Buchanan Ingersol PC

(57) ABSTRACT

A method operates on a database to extract and present information to a user. The database comprises data tables containing values of a number of variables. The information is to be extracted by evaluating at least one mathematical function which operates on one or more selected calculation variables. The presented information is to be partitioned on one or more selected classification variables. The method comprises the steps of identifying all boundary tables; identifying all connecting tables; electing a starting table among said boundary and connecting tables; building a conversion structure that links values of each selected variable in the boundary tables to corresponding values of one or more connecting variables in the starting table; and evaluating the mathematical function for each data record of the starting table, by using the conversion structure, such that the evaluation yields a final data structure containing a result of the mathematical function for every unique value of each classification variable.

14 Claims, 6 Drawing Sheets

Table 6

| Product | |
|---|---|
| Soap | 0 |
| Soft soap | 1 |
| Toothpaste | 2 |
| Shampoo | 3 |

Table 7

| Price | |
|---|---|
| 7.5 | 0 |
| 9.35 | 1 |
| 6.5 | 2 |

Table 8

| Date | |
|---|---|
| 1999-01-02 | 0 |
| 1999-01-07 | 1 |
| 1999-01-08 | 2 |
| 1999-01-11 | 3 |
| 1999-01-12 | 4 |
| 1999-01-15 | 5 |

Table 9

| Client | |
|---|---|
| Nisse | 0 |
| Gullan | 1 |
| Kalle | 2 |
| Pekka | 3 |
| Jens | 4 |

Table 10

| Number | |
|---|---|
| 3 | 0 |
| 5 | 1 |
| 8 | 2 |
| 2 | 3 |
| 10 | 4 |

Table 11

| Year | |
|---|---|
| 1999 | 0 |

Table 12

| Country | |
|---|---|
| Sweden | 0 |
| Denmark | 1 |
| Finland | 2 |

Fig. 3

Table 13

Table 14

Table 15

| | Client | Year | Price | Number |
|---|---|---|---|---|
| | 0 | | | 0 |
| | 0 | 0 | | 0 |
| R1 | 0 | 0 | 2 | 0 |
| R2 | 0 | 0 | 2 | 0 |
| R3 | 1 | 0 | 0 | 1 |
| R4 | 2 | 0 | 0 | 2 |
| R5 | 2 | 0 | -2 | 3 |
| R6 | 3 | -2 | 0 | 4 |
| R7 | 0 | 0 | 0 | 3 |

Table 16

Aggregation field

| Client | Year | Σ Number*Price |
|---|---|---|
| 0 | 0 | Sum = Sum (0) + 3 x 6.5 -> 20.5 |
| 0 | 0 | Sum = Sum (20.5) + 3 x 6.5 -> 41 |
| 1 | 0 | Sum = Sum (0) + 5 x 7.5 -> 37.5 |
| 2 | 0 | Sum = Sum (0) + 8 x 7.5 -> 60 |
| 2 | 0 | Sum = Sum (60) + 2 x (NULL) -> 60 |
| 3 | -2 | Sum = Sum (0) + 10 x 7.5 -> 75 |
| 0 | 0 | Sum = Sum (41) + 2 x (NULL) -> 41 |
| | | |
| -1 | 0 | Sum = Sum (0) +20.5 +20.5 + 37.5 + 60 + 0 + 0 ->138.5 |
| -1 | -2 | Sum = Sum (0) +75 -> 75 |
| | | |
| 0 | -1 | Sum = Sum (0) + 20.5 + 20.5 + 0 -> 41 |
| 1 | -1 | Sum = Sum (0) + 37.5 -> 37.5 |
| 2 | -1 | Sum = Sum (0) + 60 + 0 -> 60 |
| 3 | -1 | Sum = Sum (0) + 75 -> 75 |
| | | |
| -1 | -1 | Sum = Sum (0) + 20.5 + 20.5 + 37.5 + 60 + 0 + 75 + 0 -> 213.5 |

Table 17

| Client | Year | Sum (Number x Price) |
|---|---|---|
| Nisse | 1999 | 41 |
| Gullan | 1999 | 37.5 |
| Kalle | 1999 | 60 |
| Pekka | <NULL> | 75 |
| <ALL> | 1999 | 138.5 |
| <ALL> | <NULL> | 75 |
| Nisse | <ALL> | 41 |
| Gullan | <ALL> | 37.5 |
| Kalle | <ALL> | 60 |
| Pekka | <ALL> | 75 |
| <ALL> | <ALL> | 213.5 |

Table 18

Sum (Price*Number) Per Client, Year

| | 1999 | <NULL> | <ALL> |
|---|---|---|---|
| Nisse | 41 | | 41 |
| Gullan | 37.5 | | 37.5 |
| Kalle | 60 | | 60 |
| Pekka | | 75 | 75 |
| <ALL> | 138.5 | 75 | 75 |

Table 20

| Date | Product | Number | Client |
|---|---|---|---|
| 1998-12-20 | B | 5 | Nisse |
| 1999-02-05 | A | 7 | Kalle |
| 1999-02-06 | B | 9 | Kalle |

Table 21

| Product | Price group | Product group |
|---|---|---|
| A | 4 | Z |
| B | 3 | X |

Table 22

| Price group | Price |
|---|---|
| 3 | 5.5 |
| 4 | 3.5 |

Table 23

| Product group | Environment index | Legal status |
|---|---|---|
| X | I | YES |
| Y | IX | NO |
| Z | II | YES |

Fig. 5

Table 24

Product group->Environment index
X ———▷ I
Y ———▷ IX
Z ———▷ II

Table 25

Price group ->Price
3 ———▷ 5.5
4 ———▷ 3.5

Table 26

Product->Price, Environment index
A ———▷ 3.5,II
B ———▷ 5.5,I

Table 27

| Client | Environment index | Number | Price |
|---|---|---|---|
| Nisse | I | 5 | 5.5 |
| Kalle | II | 7 | 3.5 |
| Kalle | I | 9 | 5.5 |

Table 28

| Client | Environment index | Σ-Number x Price | Σ-Environment index |
|---|---|---|---|
| Nisse | I | Σx: 27.5, N: 1 | First: I, Last: I |
| Kalle | II | Σx: 24.5, N: 1 | First: II, Last: II |
| Kalle | I | Σx: 49.5, N: 1 | First: I, Last: I |
| <ALL> | I | Σx: 77, N: 2 | First: I, Last: I |
| <ALL> | II | Σx: 24.5, N: 1 | First: II, Last: II |
| <ALL> | <ALL> | Σx: 101.5, N: 3 | First: I, Last: II |

Table 29

| Client | Environment index | IF(Only (Environment index)='I', Sum(Number*Price)*2, Sum(Number*Price)) | Avg(Number*Price) |
|---|---|---|---|
| Nisse | I | 55.0 | 27.5 |
| Kalle | II | 24.5 | 24.5 |
| Kalle | I | 99.0 | 49.5 |
| <ALL> | I | 154.0 | 38.5 |
| <ALL> | II | 24.5 | 24.5 |
| <ALL> | <ALL> | <NULL> | 33.8 |

*Fig. 6*

METHOD FOR EXTRACTING INFORMATION FROM A DATABASE

TECHNICAL FIELD

The present invention relates to a method for extracting information from a database. The database comprises a number of data tables containing values of a number of variables, each data table consisting of at least one data record including at least two of said values. The information is extracted by evaluation of at least one mathematical function, which operates on one or more selected calculation variables. Further, the extracted information is partitioned on one or more selected classification variables.

BACKGROUND OF THE INVENTION

It is often desired to extract specific information from a database that is stored on a secondary memory of a computer. More specifically, there is need to summarise a large amount of data in the database, and present the summarised data to a user in a lucid way. For example, a user might be interested in extracting total sales per year and client from a database including transaction data for a large company. Thus, the extraction involves evaluation of a mathematical function, e.g. a summation ("SUM(x*y)"), operating on a combination of calculation variables (x, y), e.g. the number of sold items ("Number") and the price per item ("Price"). The extraction also involves partitioning the information according to classification variables, e.g. "Year" and "Client". Thus, the classification variables define how the result of the mathematical operation should be presented. In this specific case, the extraction of the total sales per year by client would involve evaluation of "SUM(Number*Price) per Year, Client".

In one prior-art solution, a computer program is designed to process the database and to evaluate all conceivable mathematical functions operating on all conceivable calculation variables partitioned on all conceivable classification variables, also called dimensions. The result of this operation is a large data structure commonly known as a multi-dimensional cube. This multidimensional cube is obtained through a very time-consuming operation, which typically is performed over-night. The cube contains the evaluated results of the mathematical functions for every unique combination of the occurring values of the classification variables. The user can then, in a different computer program operating on the multidimensional cube, explore the data of the database, for example by visualising selected data in pivot tables or graphically in 2D and 3D charts. When the user defines a mathematical function and one or more classification variables, all other classification variables are eliminated through a summation over the results stored in the cube for this mathematical function, the summation being made for all other classification variables. Thus, by adding or removing classification variables, the user can move up or down in the dimensions of the cube.

This approach has some undesired limitations. If the multidimensional cube after evaluation contains average quantities, e.g. the average sales partitioned on a number of classification variables, the user cannot eliminate one or more of these classification variables since a summation over average quantities does not yield a correct total average. In this case, the multidimensional cube must contain the average quantity split on every conceivable combination of classification variables as well, adding an extra complexity to the operation of building the multidimensional cube. The same problem arises for other quantities, e.g. median values.

Often it is difficult to predict all relevant mathematical functions, calculation variables and classification variables before making a first examination of the data in the database. Upon identifying trends and patterns, the user might find a need to add a function or a variable to reach underlying details in the data. Then, the time-consuming procedure of building a new multidimensional cube must be initiated.

SUMMARY OF THE INVENTION

Accordingly, the object of the present invention is to mitigate the above-mentioned drawbacks and to provide a method for extracting information from a database, which method allows the user to freely select mathematical functions and incorporate calculation variables in these functions as well as to freely select classification variables for presentation of the results.

This object is achieved by a method having the features recited in independent claim 1. Preferred embodiments are recited in the dependent claims.

According to the present invention there is provided a method for generating a final data structure, i.e. a multidimensional cube, from data in a database in an efficient way, with respect to both process time and memory requirement. Since the cube can be generated much faster than in prior-art solutions, it is possible to generate multidimensional cubes ad hoc. The user can interactively define and generate a cube without being limited to a very small number of mathematical functions and variables. The mathematical function is normally composed of a combination of mathematical expressions. If the user needs to modify the mathematical function by changing, adding or removing a mathematical expression, a new cube can normally be generated in a time short enough not to disturb the user in his work. Similarly, if the user desires to add or remove a variable, the cube can be rapidly regenerated.

This is achieved by a clever grouping of all relevant data tables into boundary tables and connecting tables, respectively, based on the type of variables included in each table. By electing one of these tables as a starting point and by building an appropriate conversion structure, the final data structure can be efficiently generated from the starting table by use of the conversion structure.

Preferably, the data records of the database are first read into the primary memory of a computer so that the data can be processed off-line. This will further reduce the time for searching the database and generating the final data structure. The database may be stored on a secondary memory or be a remotely stored database to which the computer is connected by a modem. It is to be understood that the database thus read into the primary memory may be a selected part of a larger database or a combination of two or more databases.

In one preferred embodiment, each different value of each data variable is assigned a binary code and the data records are stored in binary-coded form. On account of the binary coding, very rapid searches can be conducted in the data tables. Moreover, redundant information can be removed, resulting in a reduced amount of data.

In another preferred embodiment, all boundary and connecting tables that include calculation variables with a need for frequency data, i.e. variables for which the number of duplicates of each value is necessary for correct evaluation of the mathematical function, define a subset. By electing the starting table from this subset and by including frequency data in the conversion structure, memory-efficient storage of duplicates can be achieved when building the final data structure.

In the conversion structure, the frequency data can be included by duplication of each value, i.e. the conversion structure will contain a link from each value of a connecting variable in the starting table to a correct number of each value of at least one corresponding selected variable in a boundary table. Alternatively, a counter may be included in the conversion structure for each unique value of each connecting variable in the starting table.

Preferably, the boundary or connecting table having the largest number of data records is elected as starting table. This tends to minimise the amount of frequency data that must be incorporated in the conversion structure, which therefore can be built more rapidly.

In a further preferred embodiment, a virtual data record is created by reading a data record of the starting table and by using the conversion structure to convert each value of each connecting variable in this data record into a value of at least one corresponding selected variable. Thereby, the virtual data record will contain a current combination of values of the selected variables. The final data structure can be gradually built by sequentially reading data records from the starting table, by updating the content of the virtual data record based on the content of each such data record, and by evaluating the mathematical function based on the content of each such updated virtual data record. This procedure minimises the amount of computer memory that is needed for extracting the requested information from the database. Further, virtual data records containing undefined values, so-called NULL values, of any calculation variable can often be immediately removed, in particular when all calculation variables exhibit NULL-values, since in many cases such values can not be used in the evaluation of the mathematical function. This feature will contribute to an optimised performance.

In another preferred embodiment, an intermediate data structure is built based on the content of the virtual data record. Each data record of the intermediate data structure contains a field for each selected classification variable and an aggregation field for each mathematical expression included in the mathematical function. For each updated virtual data record, each mathematical expression is evaluated and the result is aggregated in the appropriate aggregation field based on the current value of each selected classification variable. Such an intermediate data structure allows the user to combine mathematical expressions with different need for frequency data in one mathematical function. By building several conversion structures incorporating corresponding frequency data, and by evaluating the data records of a starting table for each such mathematical expression based on a corresponding conversion structure, it is possible to merge the results of these evaluations in one intermediate data structure. Likewise, if the user modifies the mathematical function by adding a new mathematical expression operating on the already selected calculation variables, it is only necessary to add an aggregation field to the existing intermediate data structure, or to extend an existing aggregation field.

It should be noted that the virtual data record in general is indeed virtual, i.e. it is not physically allocated any memory, during the transition from a data record of the starting table to the final data structure. However, such a virtual data record can always, at least implicitly, be identified in the procedure of converting the content of a data record of the starting table into current values of the selected variables.

BRIEF DESCRIPTION OF THE DRAWINGS

These and other objects and advantages of the present invention will become more apparent and more readily appreciated to those skilled in the art upon reading the following description of the preferred embodiments, taken in conjunction with the accompanying drawings, wherein:

FIG. 3 shows exemplary Tables 6–12.
FIG. 5 shows exemplary Tables 17, 18, and 20–23.
FIG. 6 shows exemplary Tables 24–29.

DESCRIPTION OF PREFERRED EMBODIMENTS

Figure 1:
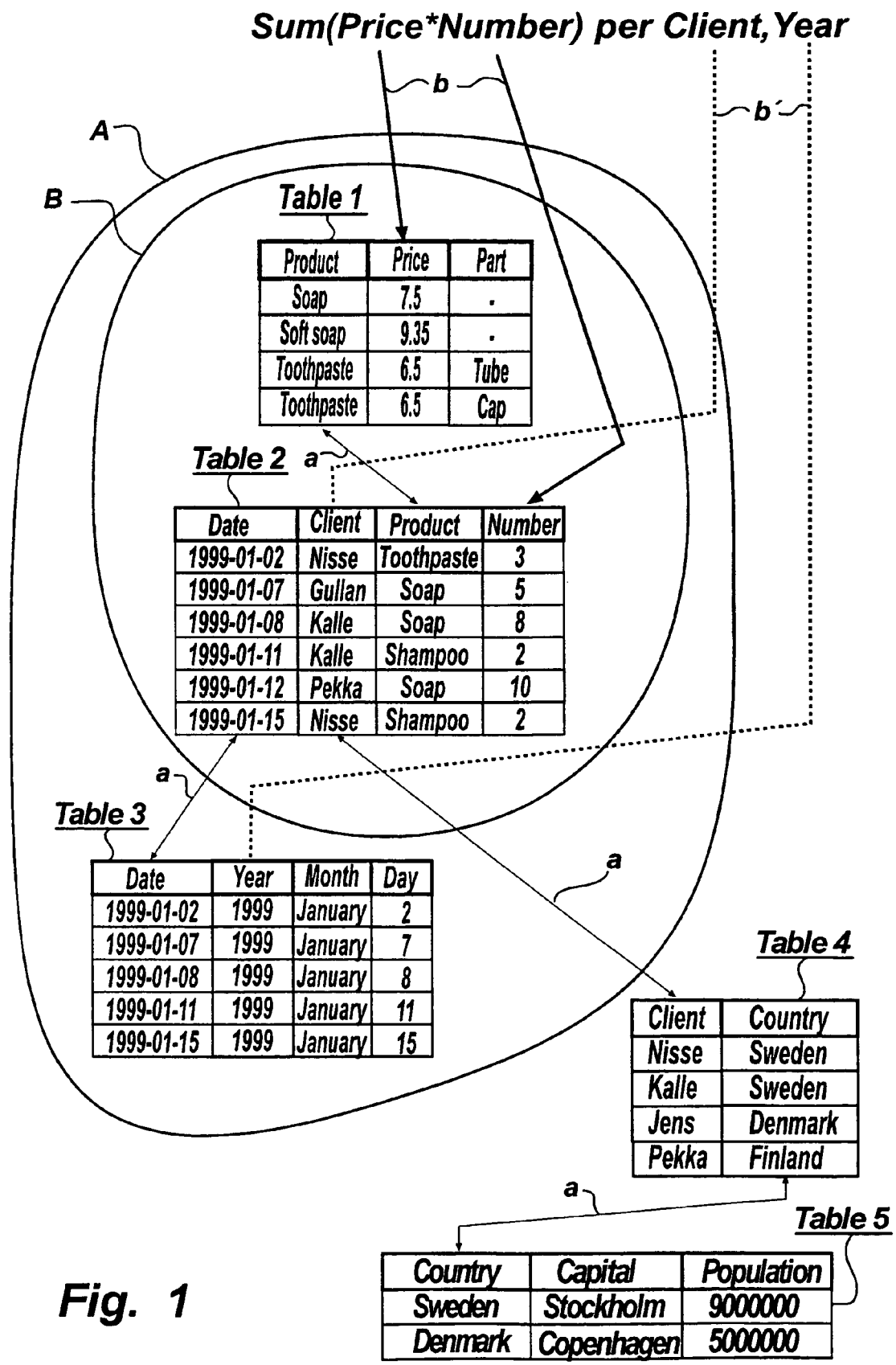
FIG. 1 shows exemplary Tables 1–5.
Figure 2:
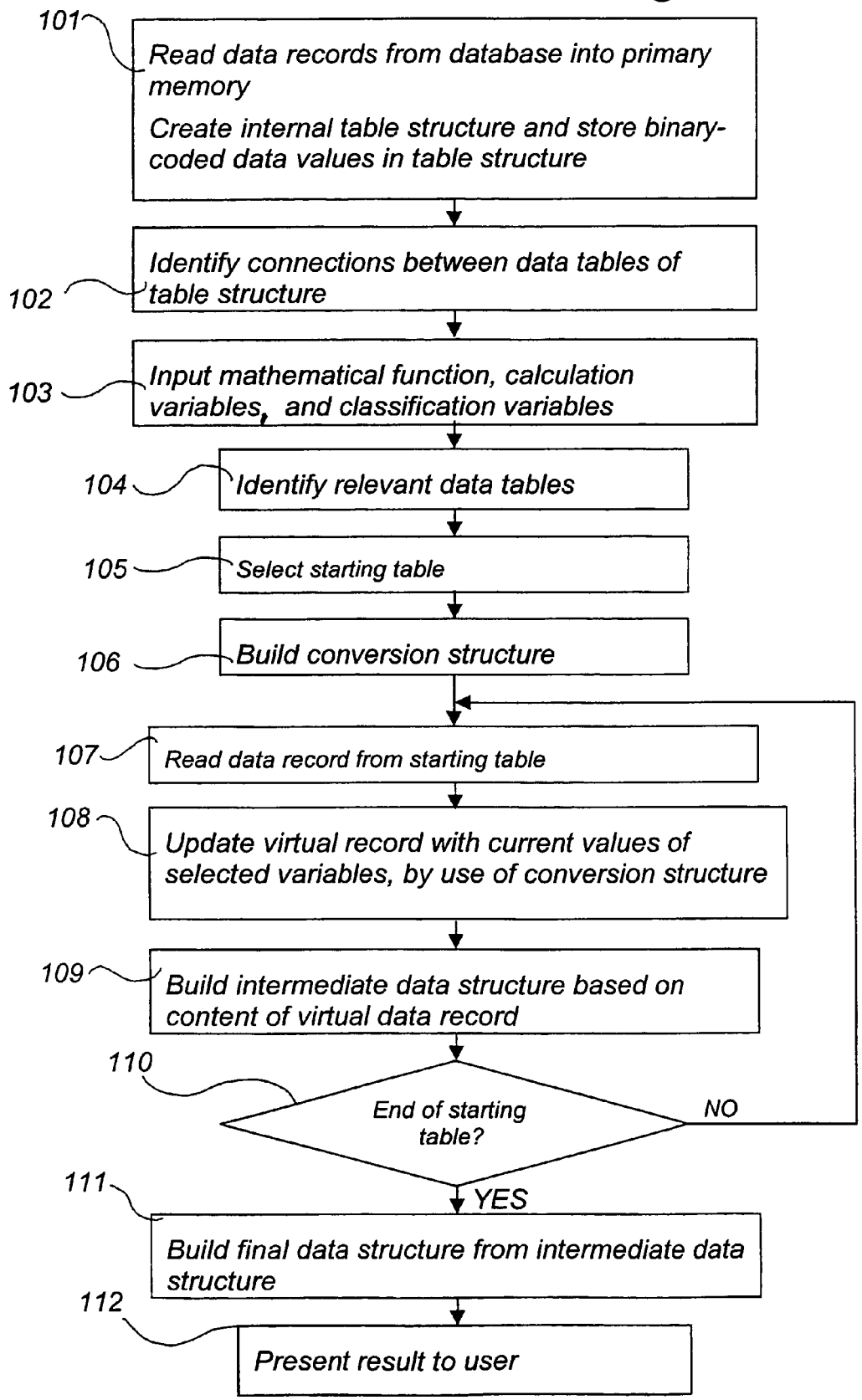
FIG. 2 shows a block flow chart of an exemplary method for extracting information from a database.

The present invention will now be described by way of examples, reference being made to FIGS. 1–6 of the drawings, FIG. 1 showing the content of a database after identification of relevant data tables according to the inventive method, FIG. 2 showing a sequence of steps of an embodiment of the method according to the invention, and FIGS. 3–6 showing exemplary data tables.

A database, as shown in FIG. 1, comprises a number of data tables (Tables 1–5). Each data table contains data values of a number of data variables. For example, in Table 1 each data record contains data values of the data variables "Product", "Price" and "Part". If there is no specific value in a field of the data record, this field is considered to hold a NULL-value. Similarly, in Table 2 each data record contains values of the variables "Date", "Client", "Product" and "Number". Typically, the data values are stored in the form of ASCII-coded strings.

The method according to the present invention is implemented by means of a computer program. In a first step (step 101), the program reads all data records in the database, for instance using a SELECT statement which selects all the tables of the database, i.e. Tables 1–5 in this case. Typically, the database is read into the primary memory of the computer.

To increase the evaluation speed, it is preferred that each unique value of each data variable in said database is assigned a different binary code and that the data records are stored in binary-coded form (step 101). This is typically done when the program first reads the data records from the database. For each input table, the following steps are carried out. First the column names, i.e. the variables, of the table are successively read. Every time a new data variable appears, a data structure is instantiated for it. Then, an internal table structure is instantiated to contain all the data records in binary form, whereupon the data records are successively read and binary-coded. For each data value, the data structure of the corresponding data variable is checked to establish if the value has previously been assigned a binary code. If so, that binary code is inserted in the proper place in the above-mentioned table structure. If not, the data value is added to the data structure and assigned a new binary code, preferably the next one in ascending order, before being inserted in the table structure. In other words, for each data variable, a unique binary code is assigned to each unique data value.

Tables 6–12 of FIG. 3 show the binary codes assigned to different data values of some data variables that are included in the database of FIG. 1.

After having read all data records in the database, the program analyses the database to identify all connections between the data tables (step 102). A connection between two data tables means that these data tables have one variable in common. Different algorithms for performing such an analysis are known in the art. After the analysis all data tables are virtually connected. In FIG. 1, such virtual connections are illustrated by double-ended arrows (a). The virtually connected data tables should form at least one so-called snowflake structure, i.e. a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can start to explore the database. In doing so, the user defines a mathematical function, which could be a combination of mathematical expressions (step 103). Assume that the user wants to extract the total sales per year and client from the database in FIG. 1. The user defines a corresponding mathematical function "SUM(x*y)", and selects the calculation variables to be included in this function: "Price" and "Number". The user also selects the classification variables: "Client" and "Year".

The computer program then identifies all relevant data tables (step 104), i.e. all data tables containing any one of the selected calculation and classification variables, such data tables being denoted boundary tables, as well as all intermediate data tables in the connecting path(s) between these boundary tables in the snowflake structure, such data tables being denoted connecting tables. For the sake of clarity, the group of relevant data tables (Tables 1–3) is included in a first frame (A) in FIG. 1. Evidently, there are no connecting tables in this particular case.

In the present case, all occurrences of every value, i.e. frequency data, of the selected calculation variables must be included for evaluation of the mathematical function. In FIG. 1, the selected variables ("Price", "Number") requiring such frequency data are indicated by bold arrows (b), whereas remaining selected variables are indicated by dotted lines (b'). Now, a subset (B) can be defined that includes all boundary tables (Tables 1–2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table is elected, preferably among the data tables within subset (B), most preferably the data table with the largest number of data records in this subset (step 105). In FIG. 1, Table 2 is elected as the starting table. Thus, the starting table contains selected variables ("Client", "Number"), and connecting variables ("Date", "Product"). These connecting variables link the starting table (Table 2) to the boundary tables (Tables 1 and 3).

Figure 4:
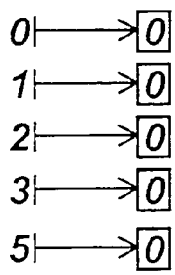
FIG. 4 shows exemplary Tables 13–16.
Figure 4:
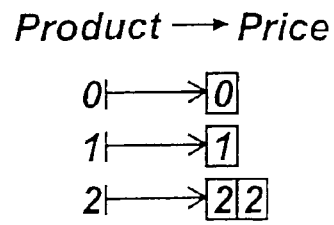

Thereafter, a conversion structure is built (step 106), as shown in Tables 13 and 14 of FIG. 4. This conversion structure is used for translating each value of each connecting variable ("Date", "Product") in the starting table (Table 2) into a value of a corresponding selected variable ("Year", "Price") in the boundary tables (Table 3 and 1, respectively). Table 13 is built by successively reading data records of Table 3 and creating a link between each unique value of the connecting variable ("Date") and a corresponding value of the selected variable ("Year"). It can be noted that there is no link from value 4 ("Date:1999-01-12"), since this value is not included in the boundary table. Similarly, Table 14 is built by successively reading data records of Table 1 and creating a link between each unique value of the connecting variable ("Product") and a corresponding value of the selected variable ("Price"). In this case, value 2 ("Product: Toothpaste") is linked to two values of the selected variable ("Price: 6.5"), since this connection occurs twice in the boundary table. Thus, frequency data is included in the conversion structure. Also note that there is no link from value 3 ("Product: Shampoo").

When the conversion structure has been built, a virtual data record is created. Such a virtual data record, as shown in Table 15, accommodates all selected variables ("Client", "Year", "Price", "Number") in the database. In building the virtual data record (step 107–108), a data record is first read from the starting table (Table 2). Then, the value of each selected variable ("Client", "Number") in the current data record of the starting table is incorporated in the virtual data record. Also, by using the conversion structure (Tables 13–14) each value of each connecting variable ("Date", "Product") in the current data record of the starting table is converted into a value of a corresponding selected variable ("Year", "Price"), this value also being incorporated in the virtual data record.

At this stage (step 109), the virtual data record is used to build an intermediate data structure (Table 16). Each data record of the intermediate data structure accommodates each selected classification variable (dimension) and an aggregation field for each mathematical expression implied by the mathematical function. The intermediate data structure (Table 16) is built based on the values of the selected variables in the virtual data record. Thus, each mathematical expression is evaluated based on one or more values of one or more relevant calculation variables in the virtual data record, and the result is aggregated in the appropriate aggregation field based on the combination of current values of the classification variables ("Client", "Year").

The above procedure is repeated for all data records of the starting table (step 110). Thus, an intermediate data structure is built by successively reading data records of the starting table, by incorporating the current values of the selected variables in a virtual data record, and by evaluating each mathematical expression based on the content of the virtual data record. If the current combination of values of classification variables in the virtual data record is new, a new data record is created in the intermediate data structure to hold the result of the evaluation. Otherwise, the appropriate data record is rapidly found, and the result of the evaluation is aggregated in the aggregation field. Thus, data records are added to the intermediate data structure as the starting table is traversed. Preferably, the intermediate data structure is a data table associated with an efficient index system, such as an AVL or a hash structure. In most cases, the aggregation field is implemented as a summation register, in which the result of the evaluated mathematical expression is accumulated. In some cases, e.g. when evaluating a median, the aggregation field is instead implemented to hold all individual results for a unique combination of values of the specified classification variables. It should be noted that only one virtual data record is needed in the procedure of building the intermediate data structure from the starting table. Thus, the content of the virtual data record is updated for each data record of the starting table. This will minimise the memory requirement in executing the computer program.

The procedure of building the intermediate data structure will be further described with reference to Tables 15–16. In creating the first virtual data record R1, as shown in Table 15, the values of the selected variables "Client" and "Number" are directly taken from the first data record of the starting table (Table 2). Then, the value "1999-01-02" of the connecting variable "Date" is transferred into the value "1999" of the selected variable "Year", by means of the conversion structure (Table 13). Similarly, the value "Toothpaste" of the connecting variable "Product" is transferred into the value "6.5" of the selected variable "Price" by means of the conversion structure (Table 14), thereby forming the virtual data record R1. Then, a data record is created in the intermediate data structure, as shown in Table 16. In this case, the intermediate data structure has tree columns, two of which holds selected classification variables ("Client", "Year"). The third column holds an aggregation field, in which the evaluated result of the mathematical expression ("x*y") operating on the selected calculation variables ("Number", "Price") is aggregated. In evaluating virtual data record R1, the current values (binary codes: 0,0) of the classification variables are first read and incorporated in this data record of the intermediate data structure. Then, the current values (binary codes: 2,0) of the calculation variables are read. The mathematical expression is evaluated for these values and added to the associated aggregation field.

Next, the virtual data record is updated based on the starting table. Since the conversion structure (Table 14) indicates a duplicate of the value "6.5" of the selected variable "Price" for the value "Toothpaste" of the connecting variable "Product", the updated virtual data record R2 is unchanged and identical to R1. Then, the virtual data record R2 is evaluated as described above. In this case, the intermediate data structure contains a data record corresponding to the current values (binary codes: 0,0) of the classification variables. Thus, the evaluated result of the mathematical expression is accumulated in the associated aggregation field.

Next, the virtual data record is updated based on the second data record of starting table. In evaluating this updated virtual data record R3, a new data record is created in the intermediate data structure, and so on.

It should be noted that NULL values are represented by a binary code of –2 in this example. In the illustrated example, it should also be noted that any virtual data records holding a NULL value (–2) of any one of the calculation variables can be directly eliminated, since NULL values can not be evaluated in the mathematical expression ("x*y"). It should also be noted that all NULL values (–2) of the classification variables are treated as any other valid value and are placed in the intermediate data structure.

After traversing the starting table, the intermediate data structure contains four data records, each including a unique combination of values (0,0; 1,0; 2,0; 3,–2) of the classification variables, and the corresponding accumulated result (41; 37.5; 60; 75) of the evaluated mathematical expression.

Preferably, the intermediate data structure is also processed to eliminate one or more classification variables (dimensions). Preferably, this is done during the process of building the intermediate data structure, as described above. Every time a virtual data record is evaluated, additional data records are created, or found if they already exist, in the intermediate data structure. Each of these additional data records is destined to hold an aggregation of the evaluated result of the mathematical expression for all values of one or more classification variables. Thus, when the starting table has been traversed, the intermediate data structure will contain both the aggregated results for all unique combinations of values of the classification variables, and the aggregated results after elimination of each relevant classification variable.

This procedure of eliminating dimensions in the intermediate data structure will be further described with reference to Tables 15 and 16. When virtual data record R1 is evaluated (Table 15) and the first data record (0,0) is created in the intermediate data structure, additional data records are created in this structure. Such additional data records are destined to hold the corresponding results when one or more dimensions are eliminated. In Table 16, a classification variable is assigned a binary code of –1 in the intermediate data structure to denote that all values of this variable are evaluated. In this case, three additional data records are created, each holding a new combination of values (–1,0; 0,–1; –1,–1) of the classification variables. The evaluated result is aggregated in the associated aggregation field of these additional data records. The first (–1,0) of these additional data records is destined to hold the aggregated result for all values of the classification variable "Client" when the classification variable "Year" has the value "1999". The second (0,–1) additional data record is destined to hold the aggregated result for all values of the classification variable "Year" when the classification variable "Client" is "Nisse". The third (–1,–1) additional data record is destined to hold the aggregated result for all values of both classification variables "Client" and "Year".

When virtual data record R2 is evaluated, the result is aggregated in the aggregation field associated with the current combination of values (binary codes: 0,0) of the classification variables, as well as in the aggregation fields associated with relevant additional data records (binary codes: –1,0; 0,–1; –1,–1). When virtual data record R3 is evaluated, the result is aggregated in the aggregation field associated with the current combination of values (binary codes: 1,0) of the classification variables. The result is also aggregated in the aggregation field of a newly created additional data record (binary codes: 1,–1) and in the aggregation fields associated with relevant existing data records (binary codes: –1,0; –1,–1) in the intermediate data structure.

After traversing the starting table, the intermediate data structure contains eleven data records, as shown in Table 16.

Preferably, if the intermediate data structure accommodates more than two classification variables, the intermediate data structure will, for each eliminated classification variable, contain the evaluated results aggregated over all values of this classification variable for each unique combination of values of remaining classification variables.

When the intermediate data structure has been built, a final data structure, i.e. a multidimensional cube, as shown in non-binary notation in Table 17 of FIG. 5, is created by evaluating the mathematical function ("SUM (x*y)") based on the results of the mathematical expression ("x*y") contained in the intermediate data structure (step 111). In doing so, the results in the aggregation fields for each unique combination of values of the classification variables are combined. In the illustrated case, the creation of the final data structure is straightforward, due to the trivial nature of the present mathematical function. The content of the final data structure might then (step 112) be presented to the user in a two-dimensional table, as shown in Table 18 of FIG. 5. Alternatively, if the final data structure contains many dimensions, the data can be presented in a pivot table, in which the user interactively can move up and down in dimensions, as is well known in the art.

Below, a second example of the inventive method is described with reference to Tables 20–29 of FIGS. 5–6. The description will only elaborate on certain aspects of this example, namely building a conversion structure including data from connecting tables, and building an intermediate data structure for a more complicated mathematical function. In this example, the user wants to extract sales data per client from a database, which contains the data tables shown in Tables 20–23 of FIG. 5. For ease of interpretation, the binary coding is omitted in this example.

The user has specified the following mathematical functions, for which the result should be partitioned per Client:

a) "IF(Only(Environment index)='I') THEN Sum (Number*Price)*2, ELSE Sum(Number*Price))", and b) "Avg(Number*Price)"

The mathematical function (a) specifies that the sales figures should be doubled for products that belong to a product group having an environment index of 'I', while the actual sales figures should be used for other products. The mathematical function (b) has been included for reference.

In this case, the selected classification variables are "Environment index" and "Client", and the selected calculation variables are "Number" and "Price". Tables 20, 22 and 23 are identified as boundary tables, whereas Table 21 is identified as a connecting table. Table 20 is elected as starting table. Thus, the starting table contains selected variables ("Number", "Client"), and a connecting variable ("Product"). The connecting variable links the starting table (Table 20) to the boundary tables (Tables 22–23), via the connecting table (Table 21).

Next, the formation of the conversion structure will be described with reference to Tables 24–26 of FIG. 6. A first part (Table 24) of the conversion structure is built by successively reading data records of a first boundary table (Table 23) and creating a link between each unique value of the connecting variable ("Product group") and a corresponding value of the selected variable ("Environment index"). Similarly, a second part (Table 25) of the conversion structure is built by successively reading data records of a second boundary table (Table 22) and creating a link between each unique value of the connecting variable ("Price group") and a corresponding value of the selected variable ("Price"). Then, data records of the connecting table (Table 21) are read successively. Each value of the connecting variables ("Product group" and "Price group", respectively) in Tables 24 and 25 is substituted for a corresponding value of a connecting variable ("Product") in Table 21. The result is merged in one final conversion structure, as shown in Table 26.

Then, an intermediate data structure is built by successively reading data records of the starting table (Table 20), by using the conversion structure (Table 26) to incorporate the current values of the selected variables ("Environment index", "Client", "Number", "Price") in the virtual data record, and by evaluating each mathematical expression based on the current content of the virtual data record.

For reasons of clarity, Table 27 displays the corresponding content of the virtual data record for each data record of the starting table. As noted in connection with the first example, only one virtual data record is needed. The content of this virtual data record is updated, i.e. replaced, for each data record of the starting table.

Each data record of the intermediate data structure, as shown in Table 28, accommodates a value of each selected classification variable ("Client", "Environment index") and an aggregation field for each mathematical expression implied by the mathematical functions. In this case, the intermediate data structure contains two aggregation fields. One aggregation field contains the aggregated result of the mathematical expression ("x*y") operating on the selected calculation variables ("Number", "Price"), as well as a counter of the number of such operations. The layout of this aggregation field is given by the fact that an average quantity should be calculated ("Avg(x*y)"). The other aggregation field is designed to hold the lowest and highest values of the classification variable "Environment index" for each combination of values of the classification variables.

As in the first example, the intermediate data structure (Table 28) is built by evaluating the mathematical expression for the current content of the virtual data record (each row in Table 27), and by aggregating the result in the appropriate aggregation field based on the combination of current values of the classification variables ("Client", "Environment index"). The intermediate data structure also includes data records in which the value "<ALL>" has been assigned to one or both of the classification variables. The corresponding aggregation fields contain the aggregated result when the one or more classification variables (dimensions) are eliminated.

When the intermediate data structure has been built, a final data structure, i.e. a multidimensional cube, is created by evaluating the mathematical functions based on the evaluated results of the mathematical expressions contained in the intermediate data structure. Each data record of the final data structure, as shown in Table 29, accommodates a value of each selected classification variable ("Client", "Environment index") and an aggregation field for each mathematical function selected by the user.

The final data structure is built based on the results in the aggregation fields of the intermediate data structure for each unique combination of values of the classification variables. When function (a) is evaluated, by sequentially reading data records of Table 28, the program first checks if both values in the last column of Table 28 is equal to 'I'. If so, the relevant result contained in the first aggregation field of Table 28 is multiplied by two and stored in Table 29. If not, the relevant result contained in the first aggregation field of Table 28 is directly stored in Table 29. When function (b) is evaluated, the aggregated result of the mathematical expression ("x*y") operating on the selected calculation variables ("Number", "Price") is divided by the number of such operations, both of which are stored in the first aggregation field of Table 28. The result is stored in the second aggregation field of Table 29.

Evidently, the present invention allows the user to freely select mathematical functions and incorporate calculation variables in these functions as well as to freely select classification variables for presentation of the results.

As an alternative, albeit less memory-efficient, to the illustrated procedure of building an intermediate data structure based on sequential data records from the starting table, it is conceivable to first build a so-called join table. This join table is built by traversing all data records of the starting table and, by use of the conversion structure, converting each value of each connecting variable in the starting table into a value of at least one corresponding selected variable in a boundary table. Thus, the data records of the join table will contain all occurring combinations of values of the selected variables. Then, the intermediate data structure is built based on the content of the join table. For each record of the join table, each mathematical expression is evaluated and the result is aggregated in the appropriate aggregation field based on the current value of each selected classification variable. However, this alternative procedure requires more computer memory to extract the requested information.

It should be realised that the mathematical function could contain mathematical expressions having different, and conflicting, needs for frequency data. In this case, steps 104–110 (FIG. 2) are repeated for each such mathematical expression, and the results are stored in one common intermediate data structure. Alternatively, one final data structure, i.e. multi-dimensional cube, could be built for each mathematical expression, the contents of these cubes being fused during presentation to the user.

What is claimed is:

1. A computer implemented method to facilitate data fusion for building a final multi-dimensional cube data structure by extracting information from a database, which comprises a number of data tables containing values of a number of variables, each data table consisting of at least one data record including at least two of said values, said information being extracted by evaluation of at least one mathematical function operating on one or more selected calculation variables, said extracted information being partitioned on one or more selected classification variables, characterized by the steps of:

initially assigning a different binary code to each unique value of each data variable in said database and storing the data records in binary-coded form in created internal table structures;

identifying all data tables containing at least one value of one of said selected calculation or classification variables, such data tables being boundary tables;

identifying all data tables that, directly or indirectly, have variables in common with said boundary tables and connect the same, such data tables being connecting tables;

electing a starting table among said boundary and connecting tables;

building a conversion structure that links values of each selected variable in said boundary tables to corresponding values of one or more connecting variables in said starting table;

evaluating said mathematical function for each data record of said starting table, by using said conversion structure to convert each value of each connecting variable into at least one value of at least one corresponding selected variable; and generating said final data structure based on said evaluation, said final data structure containing an extracted result of said mathematical function for every unique value of each classification variable.

2. A method as set forth in claim 1, characterized by the further step of presenting relevant parts of said resulting data structure to the user in human-readable form.

3. A method as set forth in claim 1, characterized by the further step of initially reading said data records of said database into the primary memory of a computer.

4. A method as set forth in claim 1, characterized by the further steps of initially identifying all data tables in said database that have variables in common, and assigning virtual connections between such data tables, thereby creating a database with a snowflake structure, wherein said connecting tables are located between said boundary tables in said snowflake structure.

5. A method as set forth in claim 1, characterized by the further steps of identifying all calculation variables for which the number of occurrences of each value is necessary for correct evaluation of said mathematical function, defining a subset of data tables consisting of boundary tables containing such variables and data tables connecting such boundary tables, electing said starting table from said subset, and including data on said number of occurrences of each value in said conversion structure.

6. A method as set forth in claim 1, characterized in that said starting table is the data table among said boundary and connecting tables having the largest number of data records.

7. A method as set forth in claim 1, characterized by the further step of building said final data structure, which includes a number of data records, each of which contains a field for each selected classification variable and an aggregation field for said mathematical function, wherein said building step includes sequentially reading a data record of said starting table, creating a current combination of values of said selected variables by using said conversion structure to convert each value of each connecting variable in said data record into a value of at least one corresponding selected variable, evaluating said mathematical function for said current combination of values, and aggregating the result of said evaluation in the appropriate aggregation field based on the current value of each selected classification variable.

8. A method as set forth in claim 1, characterized by the further step of creating a virtual data record containing a combination of values of said selected variables, wherein said creating step includes reading a data record of said starting table and using said conversion structure to convert each value of each connecting variable in said data record into a value of at least one corresponding selected variable.

9. A method as set forth in claim 8, characterized by the further step of building said final data structure which includes a number of data records, each of which contains a field for each selected classification variable and an aggregation field for said mathematical function, wherein said building step includes sequentially reading a data record of said starting table, updating the content of said virtual data record based on the content of each such data record, evaluating said mathematical function based on said updated virtual data record, and aggregating the result of said evaluation in the appropriate aggregation field based on the current value of each selected classification variable in said updated virtual data record.

10. A method as set forth in claim 8, characterized by the further step of building an intermediate data structure which includes a number of data records, each of which contains a field for each selected classification variable and an aggregation field for each mathematical expression implied by said mathematical function, wherein said building step includes sequentially reading a data record of said starting table, updating the content of said virtual data record based on the content of each such data record, evaluating each mathematical expression based on said updated virtual data record, and aggregating the result of said evaluation in an appropriate aggregation field based on the current value of each selected classification variable in said updated virtual data record.

11. A method as set forth in claim 10, characterized in that said step of building said intermediate data structure includes:

eliminating one of said classification variables in said intermediate data structure by aggregating said results over all values of said one classification variable for each unique combination of values of remaining classification variables, by creating additional data records, and by incorporating said aggregated results in said additional data records of said intermediate data structure.

12. A method as set forth in claim 10, characterized by the further step of evaluating said mathematical function based on said results in said aggregation fields for each unique combination of values of said classification variables, thereby building said final data structure.

13. A method as set forth in claim 1, characterized in that said step of building said conversion structure includes:
   a) reading data records of a boundary table, and creating a conversion structure including a link between each unique value of at least one connecting variable in said boundary table and each corresponding value of at least one selected variable therein;
   b) processing through said boundary table towards said starting table;
   c) if a connecting table is found, reading a data records of said connecting table, and substituting each unique value of said at least one connecting variable in said conversion structure for at least one corresponding unique value of at least one connecting variable in said connecting table; and
   d) repeating steps (b)–(c) until said starting table is found.

14. An article of manufacture comprising a computer readable medium having stored thereon a computer program for effecting the steps of a method for extracting information from a database as set forth in claim 1.

* * * * *